(12) United States Patent
Sugaya (10) Patent No.: US 6,398,649 B1
(45) Date of Patent: Jun. 4, 2002

(54) COMMUNICATION METHOD AND COMMUNICATION APPARATUS

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/553,768

(22) Filed: Apr. 21, 2000

(30) Foreign Application Priority Data

Apr. 23, 1999 (JP) .......................................... 11-116677

(51) Int. Cl.⁷ ................................................ A63F 9/24
(52) U.S. Cl. .......................................... 463/36; 463/42
(58) Field of Search ................................ 463/1, 30–31, 463/36–38, 40, 42; 700/91, 92; 273/148 B, 148 R; 709/200, 201; 340/286.01, 286.02, 323 R, 825, 825.06, 825.14, 825.2

(56) References Cited

U.S. PATENT DOCUMENTS 4,521,014 A * 6/1985 Sitrick
4,588,187 A * 5/1986 Dell
5,421,590 A * 6/1995 Robbins

* cited by examiner

Primary Examiner—Mark Sager
(74) Attorney, Agent, or Firm—Jay H. Maioli

(57) ABSTRACT

Connection used when a video game is executed among several persons is simplified, by a communication apparatus that includes a execution unit (10), a number of display units (21A, 22A, . . . ) for displaying a video image based on the program executed by the execution unit (10), a number of operation units (21B, 22B, . . . ) for instructing execution of the game program in the execution unit, and a communication control unit (11) for performing data communication between the execution unit, the display units, and the operation units, defining predetermined frame cycles as data communication states, setting a period in which isochronous transfer is performed in each frame cycle and a period in which asynchronous transfer is performed in each frame cycle, performing communication in divided slots for transmitting video data to the respective display units in the period in which isochronous transfer is performed in each frame cycle, and independently communicating operation data from the respective operation units by the respective slots in the period in which asynchronous transfer is performed in each frame cycle.

6 Claims, 11 Drawing Sheets

COMMUNICATION METHOD AND COMMUNICATION APPARATUS

BACKGROUND OF THE INVENTION

1. Field of the Invention

The present invention relates to a communication method which is preferably applied to a case in which a video game is executed among a plurality of persons being at separated positions in one house, and a communication apparatus to which this communication method is applied.

2. Description of the Related Art

A video game machine in which a storage medium which stores (records) a game program therein is loaded is connected to a display device such as a television receiver, and an operation unit such as a joystick connected to a game machine is operated to execute a game. In this case, a plurality of operation units are prepared, and various interplay games each of which is executed among many persons such as two, three, or more persons also exist.

Conventionally, when an interplay game is executed among many persons, the operation states of the operators are generally displayed on one display device at once, and all the operators generally see the display of the display device at once. For example, in case of an interplay game such as a car race game, the positions of cars operated by operators are displayed on one screen, and the race is executed on the screen displayed on the display device.

In contrast to this, a game having such hiddenness that operation states of operators cannot be known by other operators depending on the contents of the game also exists. For example, such a game corresponds to a trump game such as a poker game or a mah-jongg game. In such a case, display devices are prepared for the respective operators, the displays of the display devices cannot be seen from other operators (or they may be able to be seen from the other operators depending on the contents of the game) to execute the game.

When a plurality of display devices are prepared to execute an interplay video game, the display devices must be respectively connected to a game machine body, the configuration is complex disadvantageously. Conventionally, an apparatus for executing an interplay game by using the plurality of display devices is designed to be applied to a commercial large-scale apparatus which is mainly installed in a game arcade, and cannot be easily installed in a general house or the like.

More specifically, for example, a plurality of television receivers are frequently held in a general house, and the television receivers are ordinarily installed in different rooms, respectively. In order to execute an interplay video game, the receivers in the rooms are connected to the game machine body through different dedicated signal lines. The game operation units installed in the rooms must be also connected to the game machine body through different dedicated signal lines, and the connection configuration is very complex disadvantageously.

Figure 11:
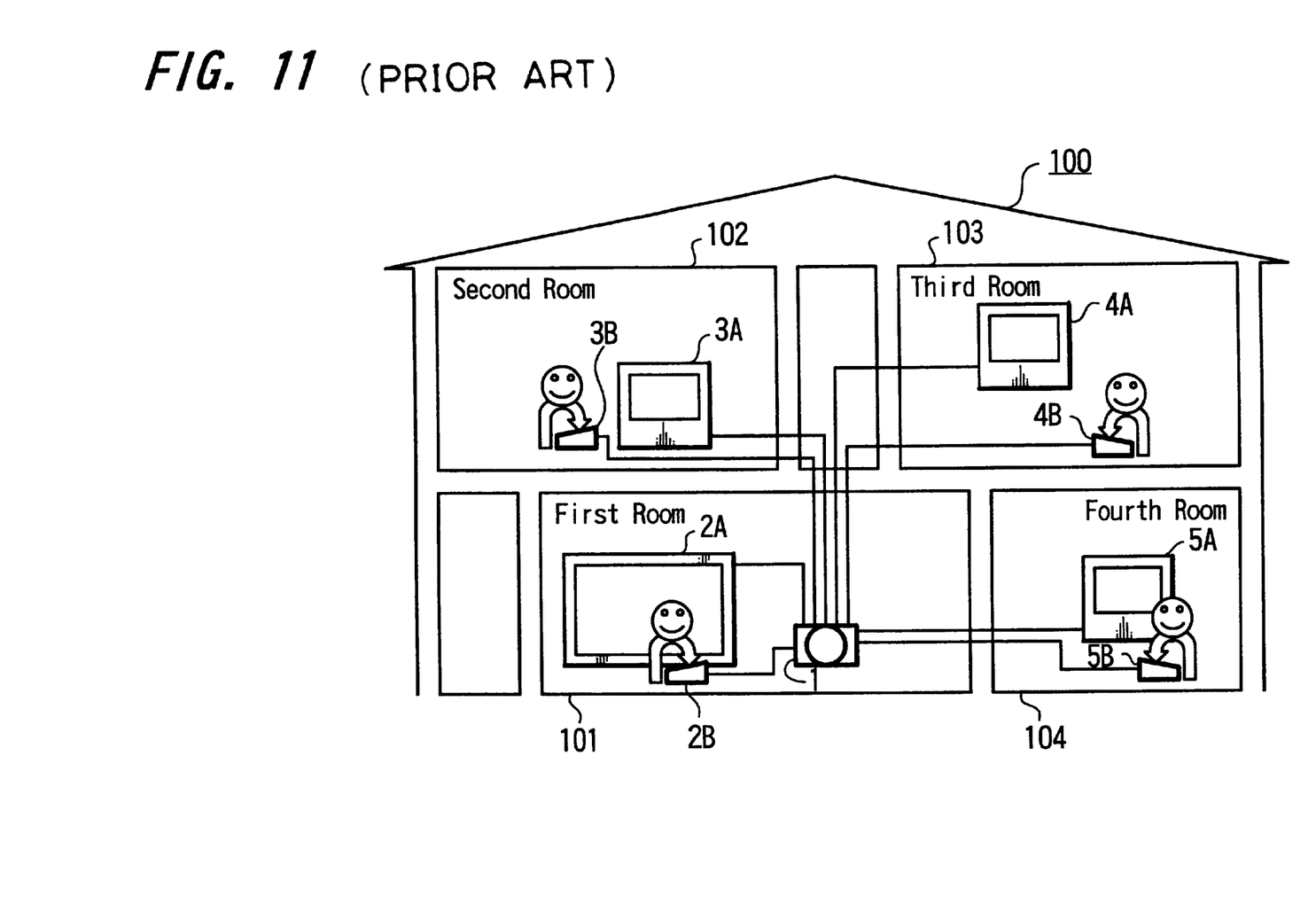
FIG. 11 is a diagram showing an indoor connection configuration of a conventional game machine.

FIG. 11 is a diagram showing a conventional installation state. In a house 100, first, second, third, and fourth rooms 101, 102, 103, and 104 are prepared, receivers 2A, 3A, 4A, and 5A for displaying a video game image and game operation devices 2B, 3B, 4B, and 5B are arranged in the rooms 101 to 104, respectively. As the receivers, image display devices each constituted by, e.g., cathode ray tubes, image display devices each constituted by a liquid crystal display panel, or the like are used. As the game operation devices, for example, input devices or the like on which joysticks or a plurality of keys are arranged and which are prepared for various game operations are used. In the first room 101, a game machine body 1 is arranged. In the game machine body 1, a storage medium which stores an arbitrary game program (the program of a game executed among four persons) therein is loaded.

Figure 12:
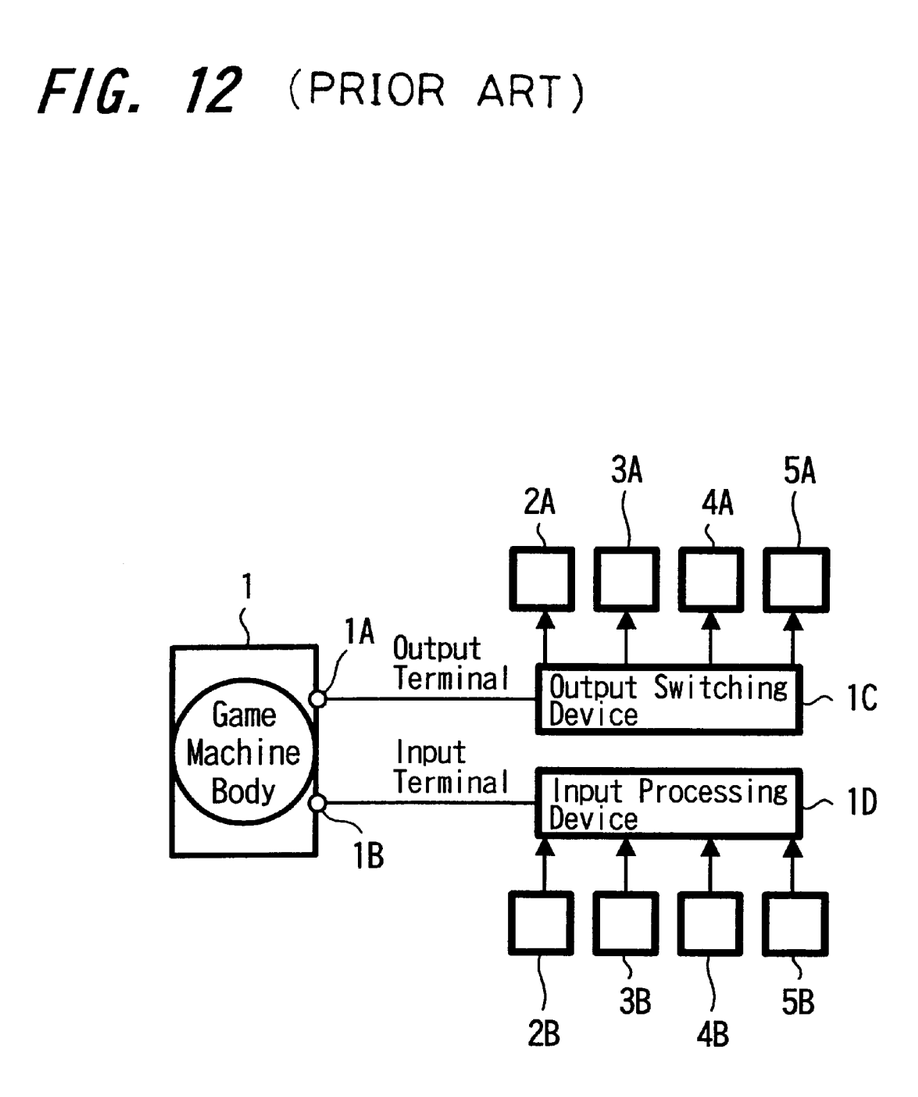
FIG. 12 is a diagram showing a connection state between a conventional game machine, receivers, and operation units.

As connection between the game machine body 1 and the receivers and the game operation devices in the rooms, for example, as shown in FIG. 12, the other ends of the signal lines having one ends connected to the game machine body 1 are connected to the different receivers and the different game operation devices. In the example shown in FIG. 12, an output switching device 1C is connected between the game machine body 1 and the receivers 2A, 3A, 4A, and 5A, and an input processing device ID is connected between the game machine body 1 and the game operation devices 2B, 3B, 4B, and 5B.

When all the receivers and operation devices prepared as described above are independently connected to the game machine body, and the respective receivers are arranged in different rooms, a large number of very long signal lines are required. In addition, the large number of signal lines must be arranged in the house, and the connection configuration is very complex disadvantageously.

SUMMARY OF THE INVENTION

It is an object of the present invention to simplify a connection formed when a video game is executed by a large number of persons.

According to the first aspect of the present invention, there is provided a communication method including the steps of:

making it possible to communicate game program execution means for executing a game program having at least a video image with a plurality of display means and a plurality of operation means through a predetermined interface;

defining a predetermined cycle as communication between the interface and the respective display means and the respective operation means and setting a period in which isochronous transfer is performed in the cycle and a period in which asynchronous transfer is performed in the cycle;

dividing the period in which isochronous transfer is performed into regions for transmitting video data to the respective display means to independently execute transmitting operations;

independently transmitting operation data from the respective operation means in the period in which asynchronous transfer is performed; and causing the display means and the operation means to independently communicate with the game program execution means by using the same communication path and performing independent operations in the respective operation means and independent display operations in the respective display means for a common game program executed by the game program execution means.

According to this communication method, the interface and the respective display means and the respective operation means are connected with a common bus line on which isochronous transfer and asynchronous transfer can be performed in a time division manner, so that respective data communication operations can be performed between one game program execution means, the respective display means, and the respective operation means.

According to the second aspect of the present invention, there is provided a communication apparatus including:

game program execution means for executing a game program having at least a video image;

a plurality of display means for displaying a video image based on the game program executed by the game program execution means;

a plurality of operation means for instructing execution of the game program in the game program execution means; and communication control means for performing data communication between the program execution means, the plurality of display means, and the plurality of operation means, defining predetermined cycles as data communication states to perform communication, setting a period in which isochronous transfer is performed in each cycle and a period in which asynchronous transfer is performed in each cycle, performing communication in divided regions for transmitting video data to the respective display means in the period in which isochronous transfer is performed, and independently communicating operation data from the respective operation means in the period in which asynchronous transfer is performed.

According to the communication apparatus, the game program execution means and the respective display means and the respective operation means are connected with a common bus line on which isochronous transfer and asynchronous transfer can be performed in a time division manner, and a communication state on the bus line is controlled by the communication control means, so that a system which can perform communication of respective data between one game program execution means, the respective display means, and the respective operation means.

DETAILED DESCRIPTION OF THE PREFERRED EMBODIMENTS

The first embodiment of the present invention will be described below with reference to FIGS. 1 to 3.

In this embodiment, the present invention is applied to a system for executing a video game in a house. Here, the video game is designed such that a video image is displayed by excuting a game program based on an operation of an operator and voice or the like depending on the video image is also output. In this case, a plurality of operators operate an interplay game at once, so that one game is simultaneously executed among a large number of persons (in this case, four persons). In order to execute the interplay game, a configuration having a plurality of display means and a plurality of operation means is obtained.

Figure 1:
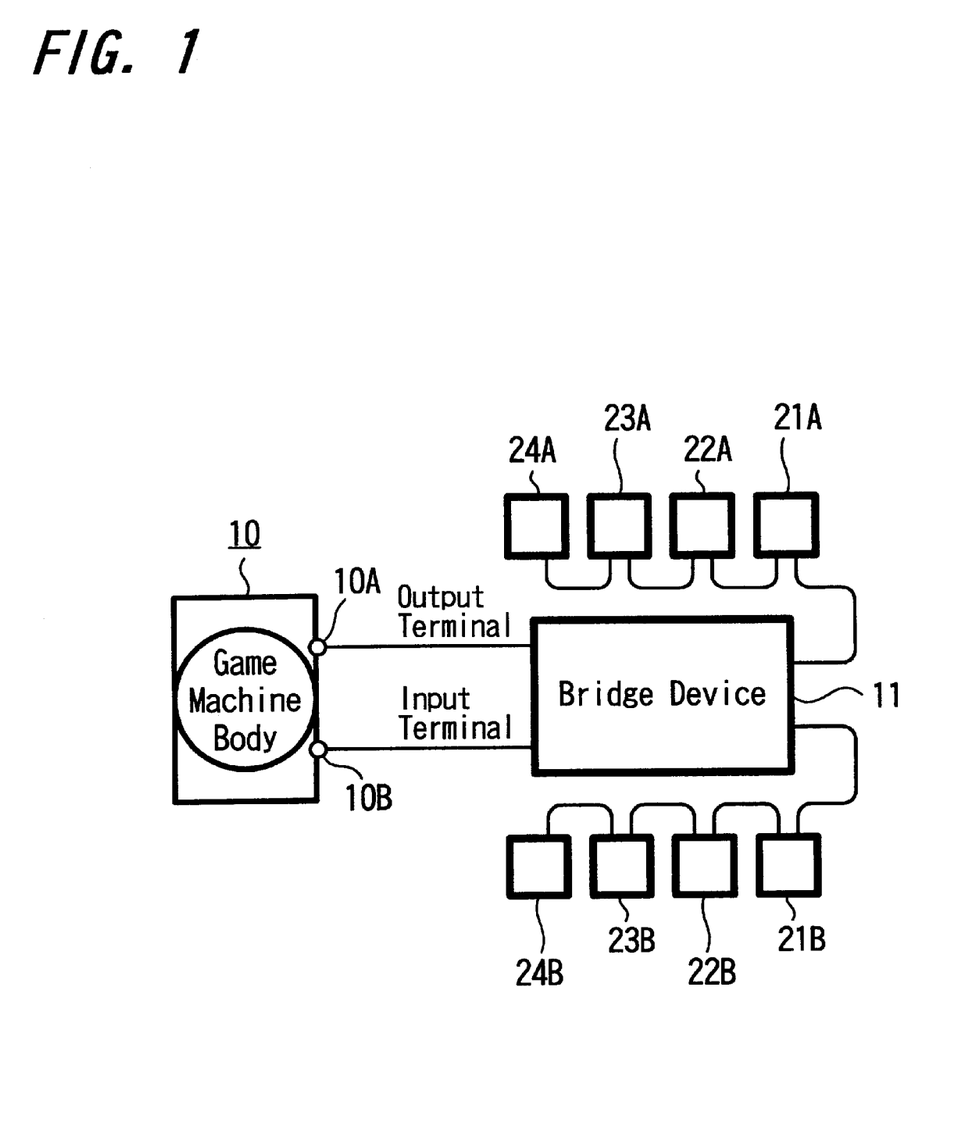
FIG. 1 is a diagram showing a connection configuration according to the first embodiment of the present invention.

FIG. 1 is a diagram showing this configuration. In a game machine body 10, a storage medium which stores (records) the game program therein is loaded. An arithmetic process for executing the game program stored in the medium is performed in the game machine body 10 to generate video data and audio data. In this case, when the interplay game is executed, video data and audio data, the numbers of which correspond to the number of persons are independently generated. More specifically, for example, in a game such as a trump game or a mah-jongg game in which hiddenness must be given to execution states of the game of other players, image data and audio data of the respective players are generated. Otherwise, even if hiddenness is not necessary, as in a car race, video data and audio data must be independently generated at positions where the operators operate the game.

The plural types of video data and audio data output from the game machine body 10 are supplied from an output terminal 10A to a bridge device 11. This bridge device 11 is a device which functions as a high-speed serial bus interface, and is sequentially connected to a plurality of receivers 21A, 22A, 23A, and 24A through a common bus line. The video data are supplied to the receivers by the bus line. In addition, the bridge device 11 is sequentially connected to a plurality of operation devices 21B, 22B; 23B, and 24B through a common bus line. Operation data from the operation devices are supplied to the bridge device 11, and the operation data are supplied from the bridge device 11 to an input terminal 10B of the game machine body 10. As the receivers 21A, 22A, 23A, and 24A, various video image display means such as television receivers using cathode ray tubes or monitor receivers using liquid crystal display panels are used. In this embodiment each of the receivers 21A, 22A, 23A, and 24A also has a loudspeaker device for outputting voice built therein. As the operation devices 21B, 22B, 23B, and 24B, dedicated operation devices prepared to operate the game machine body 10 are used.

Figure 2:
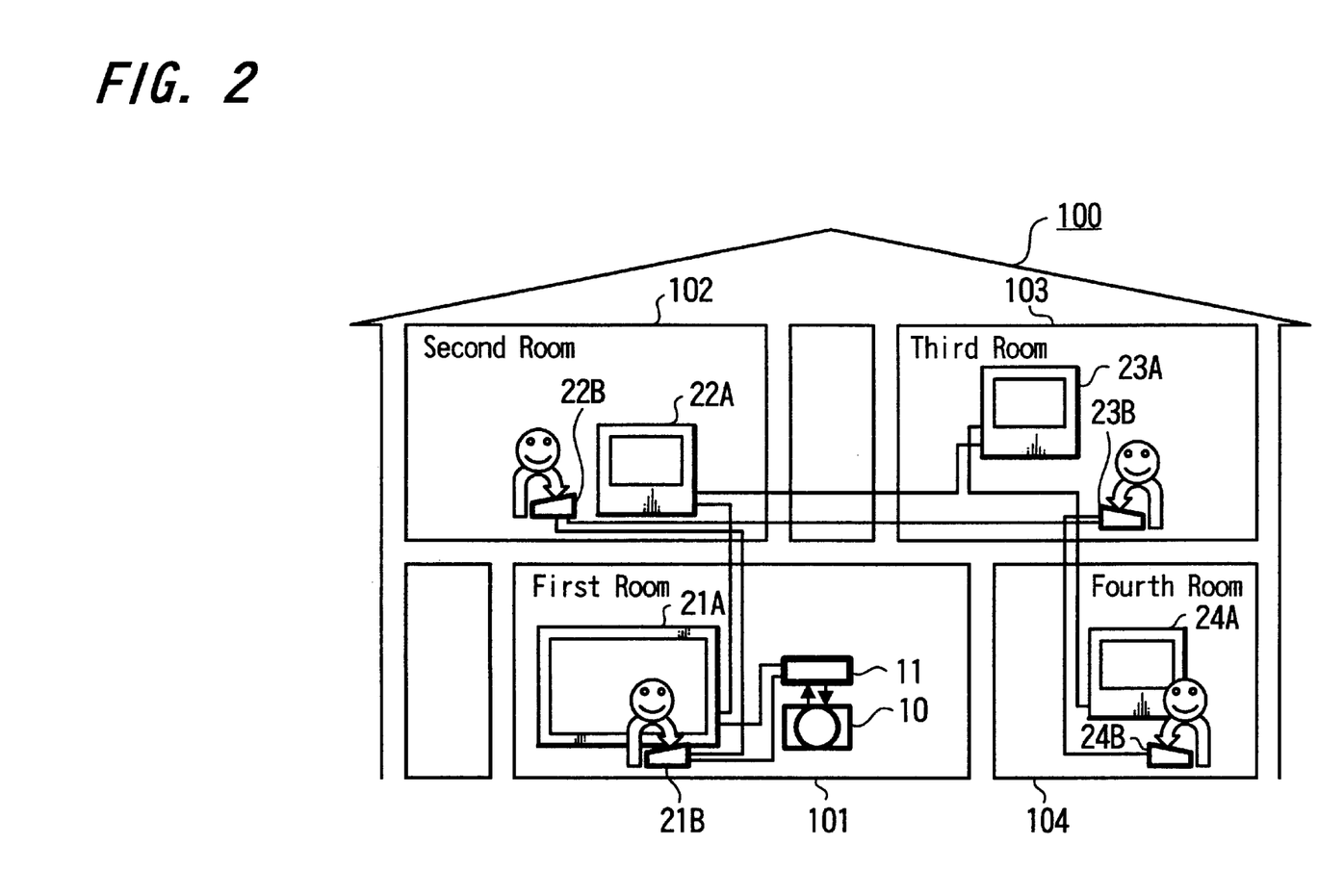
FIG. 2 is a diagram showing an indoor connection configuration according to the first embodiment of the present invention.

The receivers 21A, 22A, 23A, and 24A and the operation devices 21B, 22B, 23B, and 24B, for example, are arranged in four rooms 101, 102, 103, and 104 in a house 100 as shown in FIG. 2, respectively. More specifically, in this case, in the first room 101, the game machine body 10 and the bridge device 11 are prepared, and the receiver 21A and the operation device 21B are arranged. In the second room 102, the receiver 22A and the operation device 22B are arranged.

In the third room 103, the receiver 23A and the operation device 23B are arranged. In the fourth room 104, the receiver 24A and the operation device 24B are arranged.

The connection configuration of the bridge device 11, the receivers, the operation devices will be described next. As the bus line for connecting the bridge device 11 to the receivers and the operation devices, a bus line using a scheme defined by, e.g., IEEE 1394 standards is used. As the bus line of the standards, a signal line for transmitting data or clocks are prepared. Depending on cases, a power supply line may be arranged.

As the configuration of data transmitted by the bus line of the standards, a configuration in which data transmission performed in an asynchronous transfer mode and data transmission performed in an isochronous transfer mode can coexist in a time division manner is used. In this configuration, bidirectional communication can be achieved in a time division manner.

This isochronous transfer mode is a transmission mode in which a band to be transmitted is acquired in a cycle which is almost periodically defined, and information is periodically transmitted. For this reason, when the isochronous transfer is performed, the process of assuring the band to be transmitted in advance must be performed. When the band to be transmitted can be assured, and an isochronous (short) gap is detected on a cable bus with reference to a cycle start packet transmitted from a root node, transmission can be started.

In addition, unlike the isochronous mode, the asynchronous transfer mode is a method in which information is asynchronously transmitted without assuring a band.

An isochronous transfer mode and an asynchronous transfer mode are selectively used depending on the types of data to be transmitted. More specifically, the asynchronous transfer mode is used in transmission of relatively short data such as control data, and the isochronous transfer mode is used in transmission of data such as video data or audio data which must be transferred on real time. In this embodiment, the asynchronous transfer mode is used in transmission of operation data from an operation device, and the isochronous transfer mode is used in transmission of video data and audio data.

Figure 3:
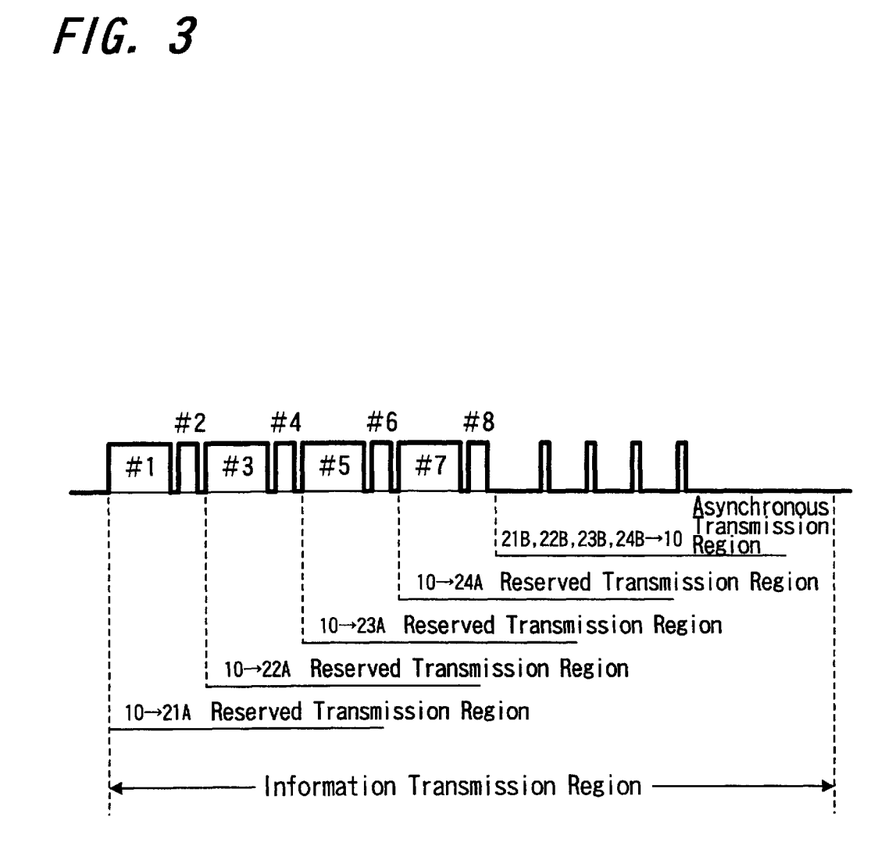
FIG. 3 is a chart for explaining an appliance of transmission regions according to the first embodiment of the present invention.

FIG. 3 is a chart showing a configuration of data transmitted by the bus line of the embodiment. In the embodiment, data constituted by slots are transmitted, and regions in which information are constituted as shown in FIG. 3, for example. In this case, at least 8 slots., i.e., slot #1, #2, . . . , #8 are periodically arranged. The slots #1 to #8 are reserved as is dchronous channels for performing transmission in an isochronous transfer mode. The length of each slot is not always constant.

Here, the slots #1 to #8 for performing transmission in the isochronous transfer mode are defined as slots reserved as slots for video data and audio data from the bridge device 11. More specifically, the slots #1 and #2 are defined as a region reserved as slots for transmitting video data and audio data from the game machine body 10 to the receiver 21A through the bridge device 11, and the slots #3 and #4 are defined as a region reserved as slots for transmitting video data and audio data from the game machine body 10 to the receiver 22A through the bridge device 11. The slots #5 and #6 are defined as a region reserved as slots for transmitting video data and audio data from the game machine body 10 to the receiver 23A through the bridge device 11, and the slots #7 and #8 are defined as a region reserved as slots for transmitting video data and audio data from the game machine body 10 to the receiver 24A through the bridge device 11. The reserving process of these slots is performed by the bridge device 11 serving as a device for controlling transmission in the bus line.

Arbitrary parts of the remaining regions for performing transmission in the asynchronous transfer mode are used for transmitting operation data when operation data must be transmitted from the operation devices 21B to 24B, and the operation data received by the bridge device 11. The operation data are received by the bridge device 11 is supplied to the game machine body 10. In this case, the remaining regions for the asynchronous transfer mode are prepared in one cycle. For this reason, when transmission of one unit of operation data from the operation devices is completed by one slot, even if the four operation devices simultaneously request operation data to be transmitted, all the data can be transmitted within one cycle. Here, the eight slots are used in the isochronous transfer mode, and the remaining regions are used in the asynchronous transfer mode. Depending on the number of slots used in data transmission at this time, regions used in both the mode are variably set.

The receivers 21A, 22A, 23A, and 24A and the operation devices 21B, 22B, 23B, and 24B have interface functions for connecting the bus line in which transmission is performed with the data configuration. In this case, interface portions included in the respective receivers are designed such that, of data transmitted in the isochronous transfer mode, only video data and audio data transmitted and decoded by slots allocated to the receivers can be received and decoded.

More specifically, for example, the video data and the audio data transmitted from the bridge device 11 with the slots #1 and #2 are received and decoded by only the receiver 21A installed in the first room 101, so that a video image can be displayed, and so that voice can be output. The video data and the audio data transmitted from the bridge device 11 with the slots #3 and #4 are received and decoded by only the receiver 22A installed in the second room 102, so that a video image can be displayed, and so that voice can be output. The video data and the audio data transmitted from the bridge device 11 with the slots #5 and #6 are received and decoded by only the receiver 23A installed in the third room 103, so that a video image can be displayed, and so that voice can be output. Furthermore, the video data and the audio data transmitted from the bridge device 11 with the slots #7 and #8 are received and decoded by only the receiver 24A installed in the fourth room 104, so that a video image can be displayed, and so that voice can be output. These processes are performed on the basis of isochronous channel numbers given to, e.g., the header portions of the slots.

With the above configuration, video data and audio data can be independently supplied from the game machine body 10 to the four receivers. By the receiver 21A, 22A, 23A, and 24A, a video image generated for the respective receivers can be displayed, and voice generated for the respective receivers can be output. The video image displayed by a receiver cannot be displayed by another receivers, and the voice output by a receiver cannot be output. For this reason, hiddenness which required to execute the game can be assured.

In this embodiment, a connection configuration used when four receivers and four operation devices are connected to one game machine body 10 can be simplified. More specifically, as shown in FIG. 2, as receivers, the receivers 21A, 22A, 23A, and 24A may be sequentially connected from the bridge device 11 through one bus line, and, as operation devices, the receivers 21B, 22B, 23B, and 23B are sequentially connected from the bridge device 11 through one bus line. This connection configuration can be made considerably simpler than a conventional connection configuration in which all the receivers and all the operation devices are connected to the game machine body.

In the description up to this, although display of different video image and outputting of different voices are performed by the four receivers, display of a common video image and outputting of a common voice can also be performed by the four receivers. In this case, the same video data and the same audio data are repeatedly arranged and transmitted to the slots destined for the receivers shown in FIG. 3, video data and audio data transmitted with the slots #1 and #2 and the like may be received and demodulated by all the receivers, so that display of a video image and outputting of voice can be performed.

In the connection configuration shown in FIG. 2, the bus line for the receivers and the bus line for the operation devices, i.e., a total of two bus lines are drawn in the house 100 as different bus lines. However, since the data configuration transmitted by the bus lines is made common such that video or audio data and operation data can be simultaneously transmitted as shown in FIG. 3, only one bus line may be sequentially connected to the receivers and the operation devices.

Figure 4:
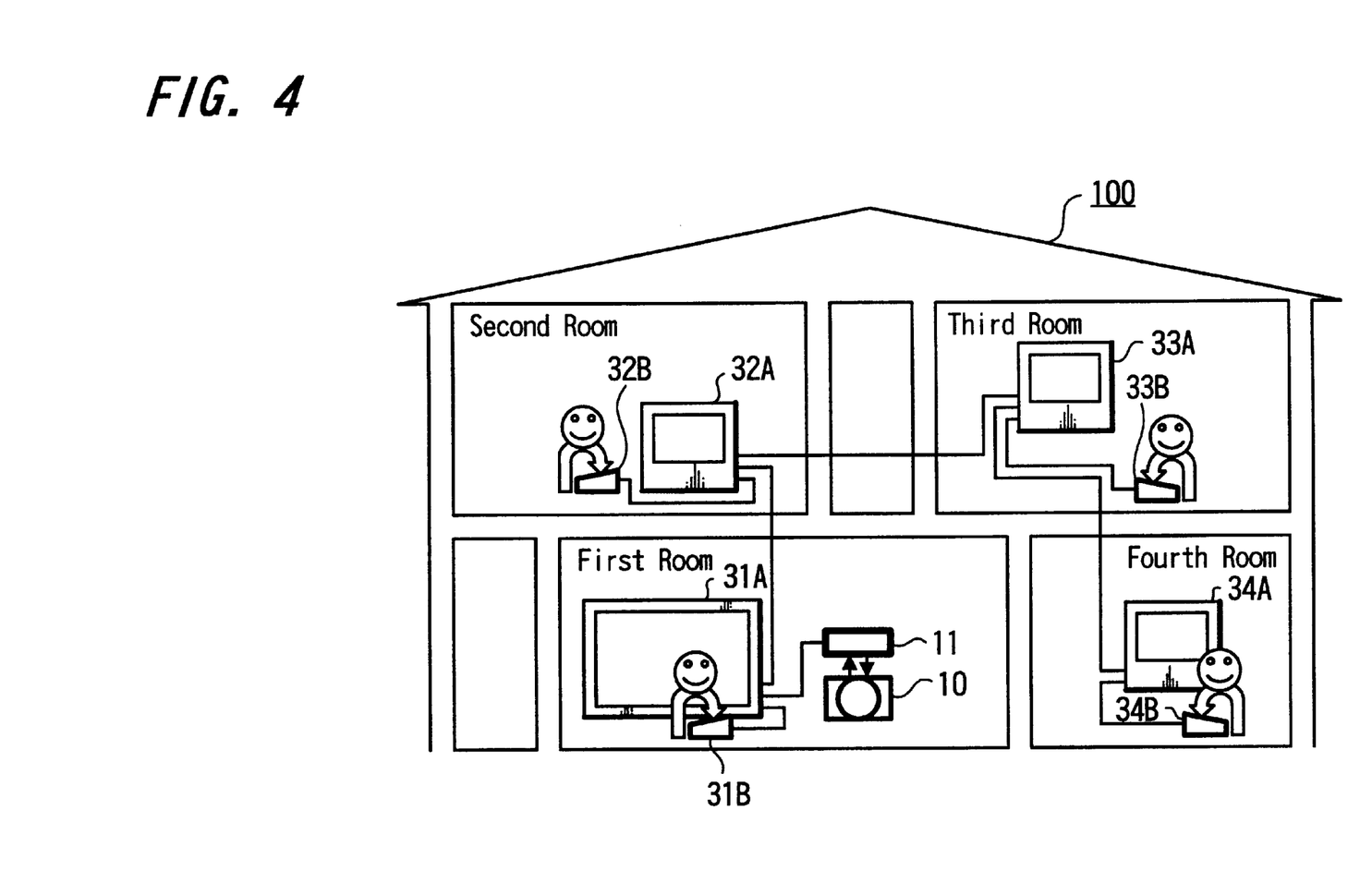
FIG. 4 is a diagram showing a modification of the indoor connection configuration according to the first embodiment of the present invention.

For example, as shown in FIG. 4, a receiver 31A and an operation device 31B in the first room 101 are connected to each other, a receiver 32A and an operation device 32B in the second room 102 are connected to each other, a receiver 33A and an operation device 33B in the third room 103 are connected to each other, and a receiver 34A and an operation device 34B in the fourth room 104 are connected to each other. Operation data from the operation devices are supplied to the receiver side. As a connection configuration obtained by a common bus line, a configuration in which the bridge device 11 is sequentially connected to the receiver 31A in the first room 101, the receiver 32A in the second room 102, the receiver 33A in the third room 103, and the receiver 34A in the fourth room 104. Video data and audio data from the bridge device 11 are received in each receiver, operation data from the operation device connected to the corresponding receiver can be transmitted.

With the configuration shown in FIG. 4, only one series of bus lines may be arranged, a connection configuration can be more simplified.

Figure 5:
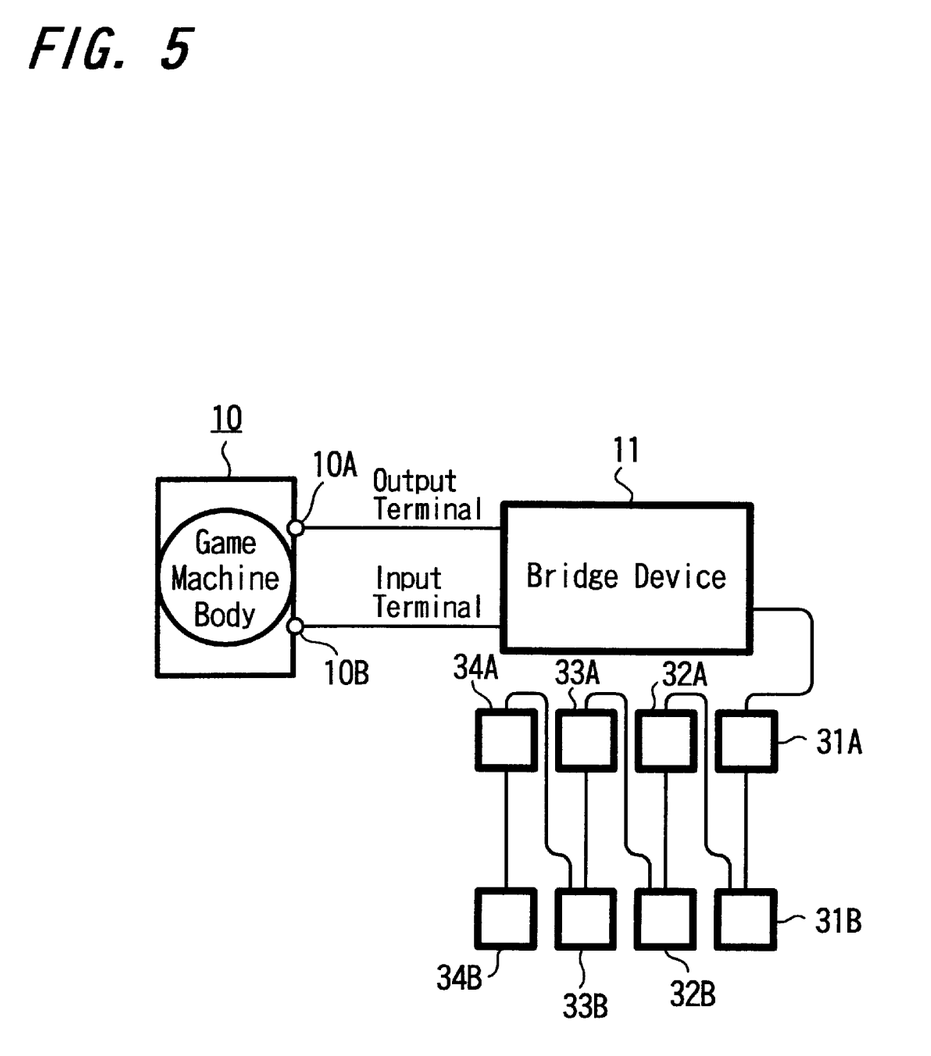
FIG. 5 is a diagram showing another modification of the connection configuration in the house according to the first embodiment of the present invention.

Otherwise, the receivers and the operation devices in the rooms may be sequentially connected to each other in common. More specifically, for example, as shown in FIG. 5, as the connection sequence of the bus line from the bridge device 11, a sequence, i.e., the receiver 31A, the operation device 31B, the receiver 32A, the operation device 32B, the receiver 33A, the operation device 33B, the receiver 34A, and the operation device 34B may be used. Even if the connection configuration shown in FIG. 4 or 5 is set, the same process as shown in FIGS. 1 and 2 can be performed.

The second embodiment of the present invention will be described below with reference to FIGS. 6 to 8. In this embodiment, as in the first embodiment described above, the present invention is applied to a system in which a video game such as an interplay game is executed among a plurality of persons in a house.

In this embodiment, the game machine body, the receivers, and the operation devices are not connected to each other through a cable bus line, and data transmission is performed by wireless communication. More specifically, as shown in FIG. 6, in the first room 101 in the house 100, a game machine body 40 in which a storage medium which stores (records) a game program therein is prepared, and the game machine body 40 is connected to a wireless transmission device 50A.

A wireless transmission device 50B is connected to a receiver 41A installed in the first room 101, a wireless transmission device 50C is connected to a receiver 42A and an operation device 42B which are installed in the second room 102, a wireless transmission device 50D is connected to a receiver 43A installed in the third room 103, and a wireless transmission device 50E is connected to an operation device 43B installed in the third room 103. In addition, a wireless transmission device 50F is connected to a receiver 44A installed in the fourth room 104, and a wireless transmission device 50G is connected to a operation device 44B installed in the fourth room 104. Here, an operation device 41B installed in the first room 101 is directly connected to the game machine body 40 through a signal line.

Figure 6:
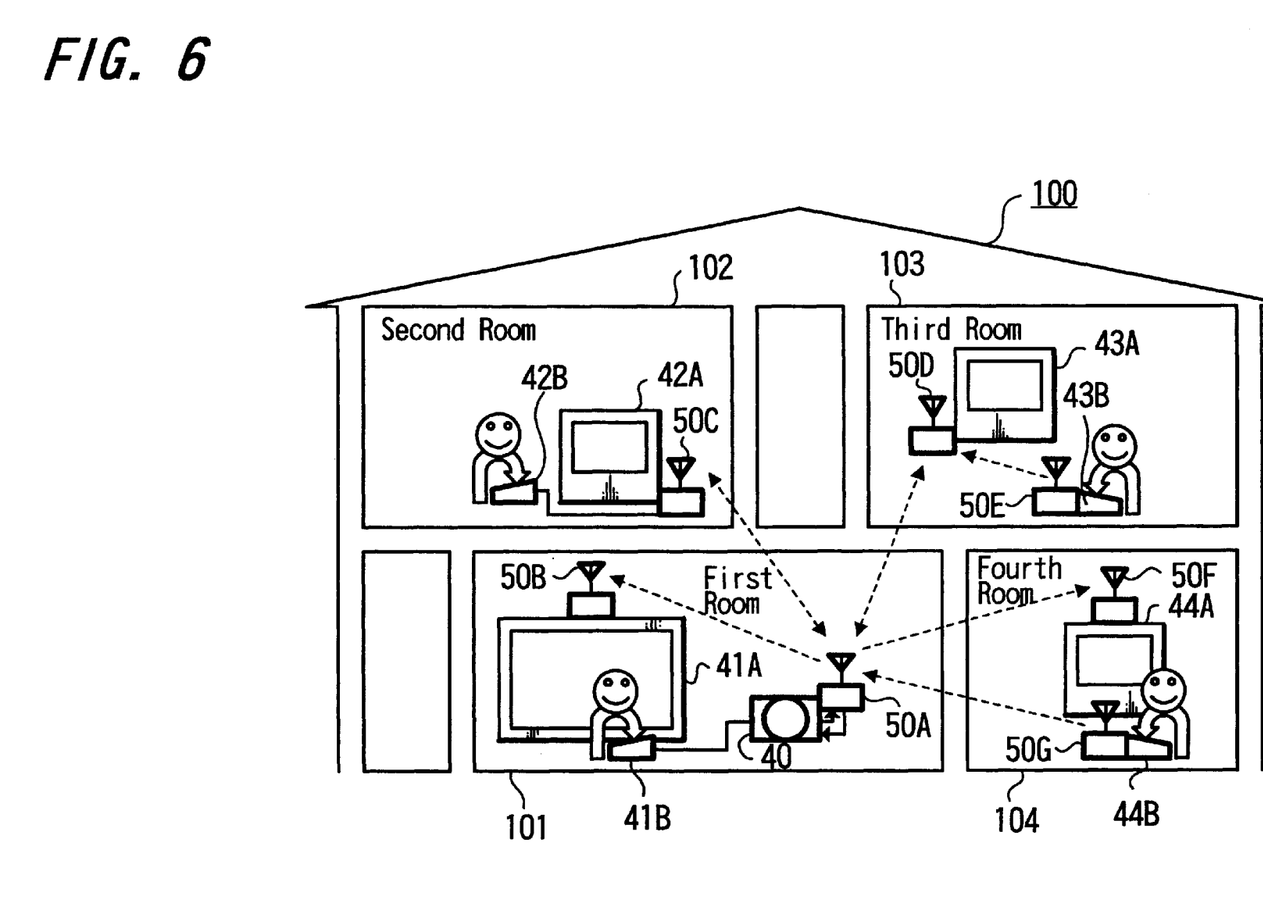
FIG. 6 is a diagram showing an indoor connection configuration according to the second embodiment of the present invention.

The wireless transmission device 50A connected to the game machine body 40 directly wireless-communicates with the wireless transmission devices 50B, 50C, 50D, 50F, and 50G as indicated by arrows in FIG. 6. The wireless transmission device 50E connected to the operation device 43B in the third room 103 wireless-communicates with the wireless transmission device 50A through the wireless transmission device 50D connected to the receiver 43A in the same room.

Figure 7:
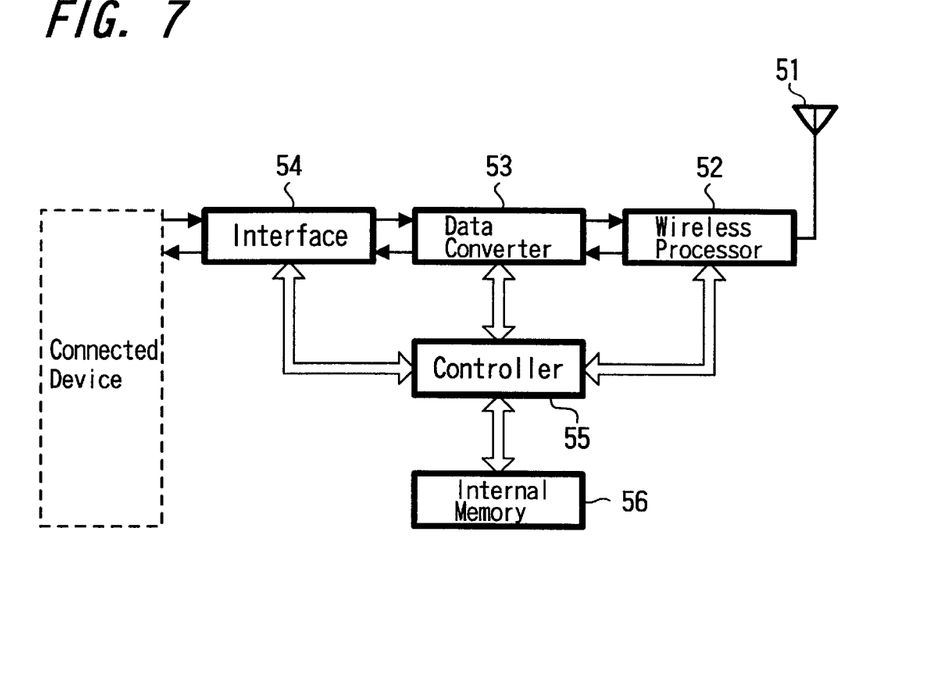
FIG. 7 is a block diagram showing a configuration of a wireless transmission device applied to the second embodiment of the present invention.

As the configuration of each of the wireless transmission devices 50A to 50G, for example, the configuration shown in FIG. 7. In this case, the configurations of the wireless transmission devices 50A to 50G are basically equal to each other. Each of the wireless transmission devices 50A to 50G having an antenna 51 for performing transmission and reception and a wireless processor 52, connected to the antenna 51, for performing a transmission process of a radio signal and a reception process of a radio signal, so that wireless transmission with another transmission device can be performed. In this case, as a transmission scheme for performing transmission and reception in the-wireless processor 52 of the embodiment, for example, a transmission scheme called an OFDM (Orthogonal Frequency Division Multiplex) scheme using a multi-carrier signal is applied. As frequencies used in transmission and reception, for example, a very high frequency band (e.g., 5-GHz band) is used. In this embodiment, as a transmission output, a relatively low output is set. For example, when the devices are used indoors, an output having a strength at which wireless transmission in a relatively short distance falling within the range of several meters to about several tens of meters is set.

Each radio transmission device has a data converter 53 for performing data conversion of a signal received by the wireless processor 52 and data conversion of a signal transmitted by the wireless processor 52. The data converted by the data converter 53 is supplied to a device (one of the game machine body, the receiver, and the operation device) connected through an interface unit 54, and the data supplied from the connected device is supplied to the data converter 53 through the interface unit 54, so that the conversion process can be performed.

The respective parts in the wireless transmission device are designed to execute the process on the basis of the control of the controller 55 constituted by a microcomputer or the like. In this case, when a signal received by the wireless processor 52 is a control signal, the received control signal is supplied to the controller 55 through the data converter 53, and the controller 55 sets the parts in a state indicated by the received control signal. In addition, the control signal transmitted from the controller 55 to another transmission device is also supplied from the controller 55 to the wireless processor 52 through the data converter 53, so that wireless transmission is performed. When the received signal is a synchronous signal, a reception timing of the synchronous signal is determined by the controller 55, a frame cycle based on the synchronous signal is set, and a communication control process is executed in the frame cycle. An internal memory 56 is connected to the controller 55, and data required for communication control is temporarily stored in the internal memory 56.

Figure 8:
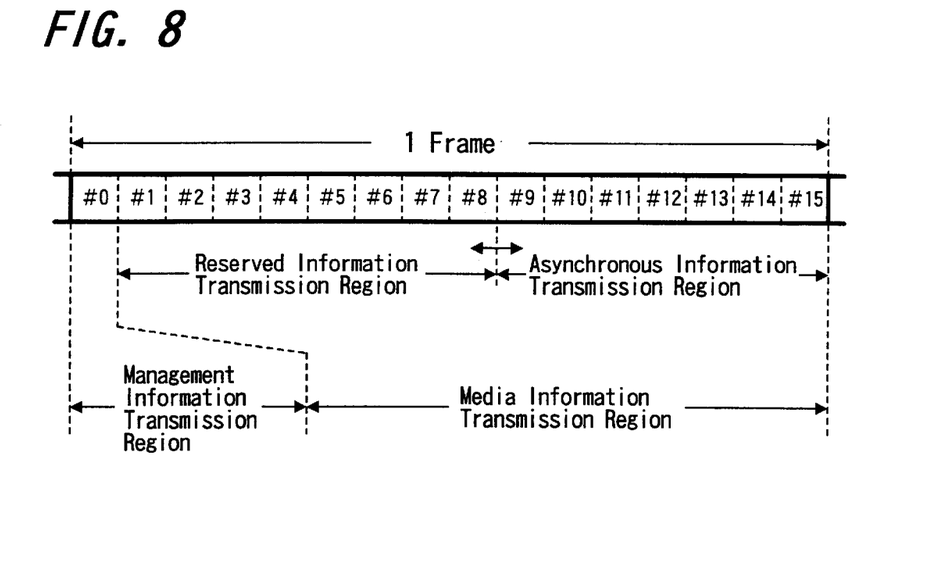
FIG. 8 is a chart for explaining a frame configuration according to the second embodiment of the present invention.

FIG. 8 shows the configuration of a signal transmitted between wireless transmission devices of the embodiment. In this case, a frame cycle is defined to perform data transmission. FIG. 8 shows configuration of a 1-frame period. A slot #0 of the start portion of a 1-frame period is set as a management information transmission region, transmission of synchronous data for defining a frame cycle, transmission of control data from a wireless transmission device for performing communication control, and the like are performed.

Figure 9:
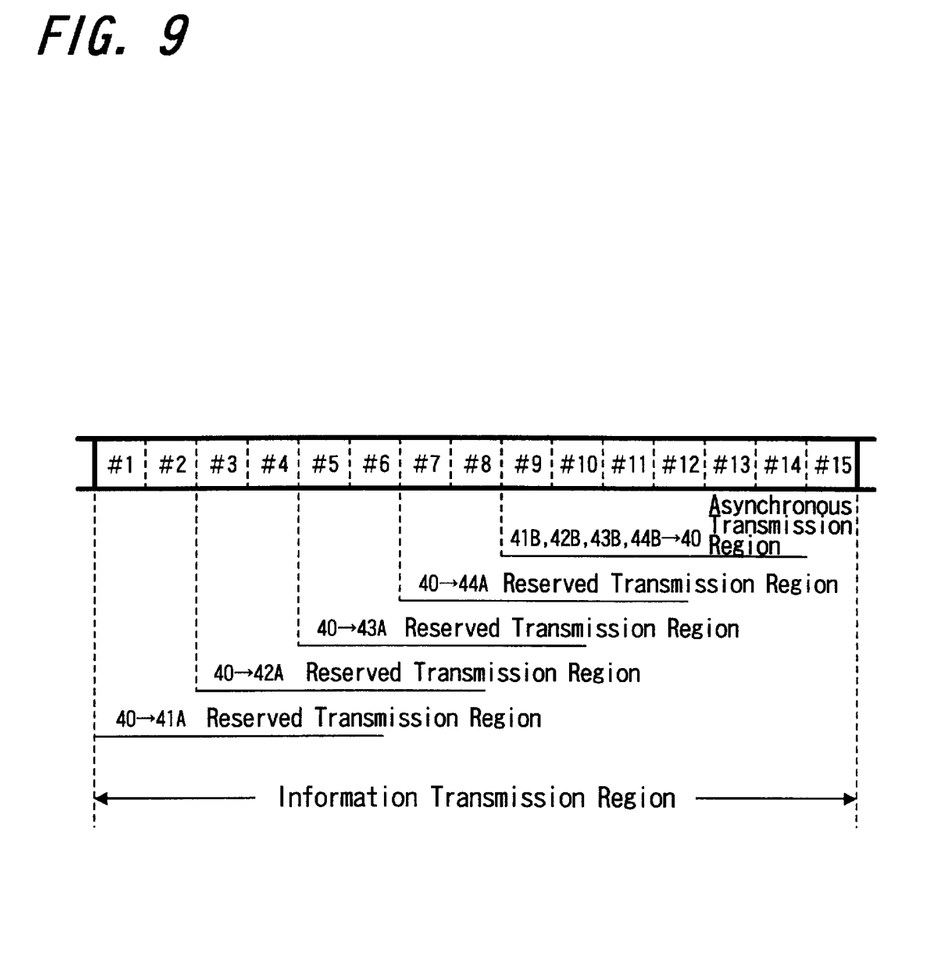
FIG. 9 is a chart for explaining an appliance of transmission regions according to the second embodiment of the present invention.

The remaining slots #1 to #15 in one frame are set as a media information transmission region. The configuration of the media information transmission region is the same as the configuration which transmission is performed by a cable bus line, shown in FIG. 3 in advance. More specifically, for example, the slots #1 to #8 of the first half are defined as slots for performing transmission in an isochronous transfer mode and as slots for independently transmitting video data and audio data to the receivers. The remaining region is also divided into slots. The remaining slots #9 to #15 are defined as slots for performing transmission in an asynchronous transfer mode and as slots for transmitting respective operation data from the operation device. As allocation of the slots, the configuration shown in FIG. 9 is applied.

More specifically, for example, the slots #1 and #2 are defined as a region reserved as slots for transmitting video data and audio data from the game machine body 40 to the receiver 41A, and the slots #3 and #4 are defined as a region reserved as slots for transmitting video data and audio data from the game machine body 40 to the receiver 42A. The slots #5 and #6 are defined as a region reserved as slots for transmitting video data and audio data from the game machine body 40 to the receiver 43A, and the slots #7 and #8 are defined as a region reserved as slots for transmitting video data and audio data from the game machine body 40 to the receiver 44A.

In the slots #9 to #15 for performing transmission in an asynchronous mode, when operation data must be transmitted from the operation devices 42B to 44B, an idle slot is used for transmission of the operation data to transmit the operation data to the game machine body 40.

In this configuration, respective video data and respective audio data can be transmitted from the game machine body 40 to the receivers in wireless transmission, and operation data from the operation devices corresponding to the receivers can be transmitted, and execution of an interplay game can be easily performed without requiring a wiring operation.

Figure 10:
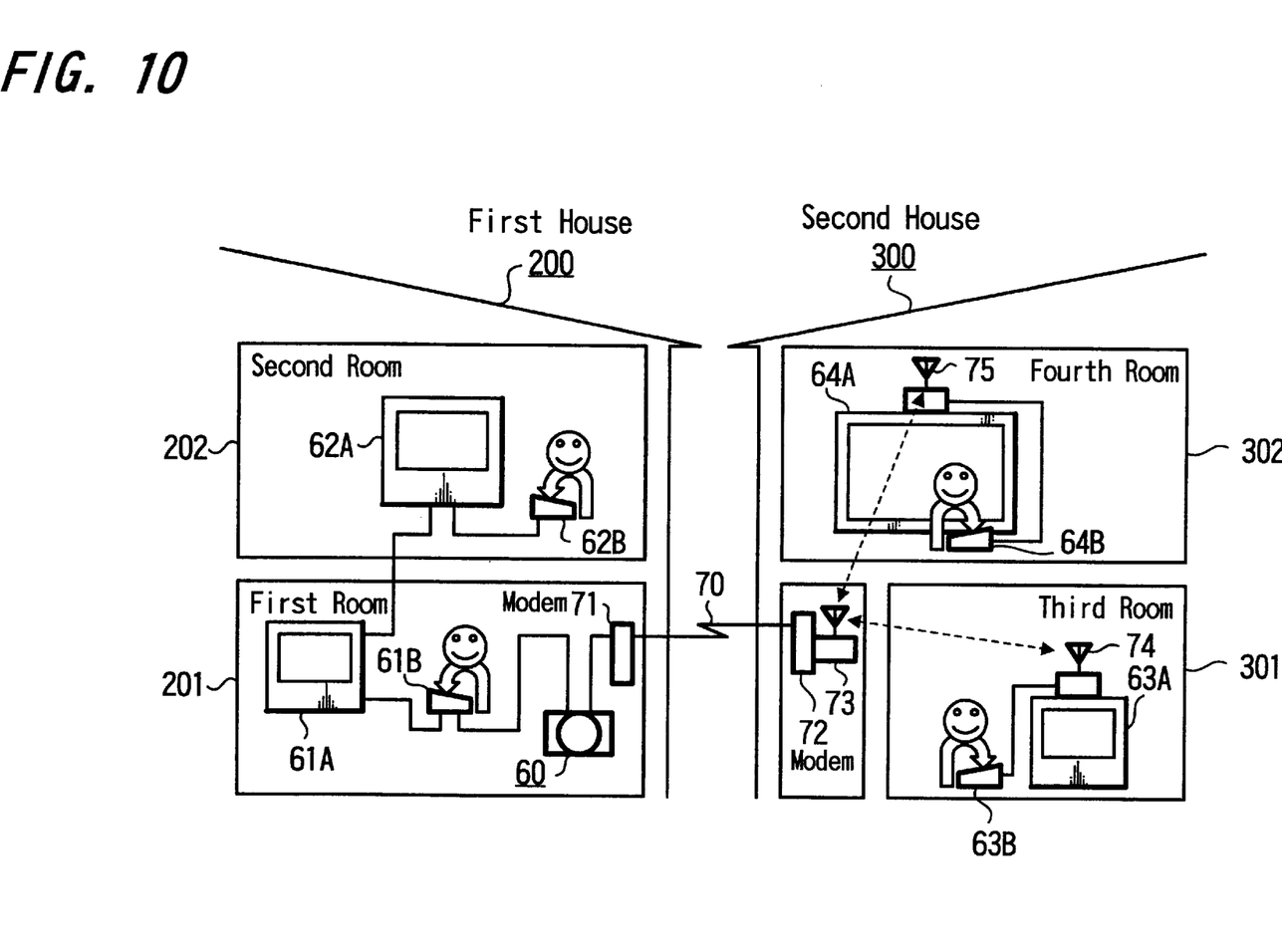
FIG. 10 is a diagram showing a connection configuration according to still another embodiment of the invention.

In each of the embodiments described up to this, the case in which an interplay game is executed in a plurality of rooms in one house has been described. However, the following configuration may be used. That is, a plurality of houses are connected to each other through telephone lines or the like, receivers and operation devices arranged between the plurality of houses are used to execute one interplay game or the like. More specifically, for example, as shown in FIG. 10, a game main body 60 in which a storage medium which stores a video game program therein is loaded is installed in a first room 201 in a first house 200, and the game main body 60 is sequentially connected to an operation device 61B and a receiver 61A in the first room 201 and a receiver 62A and an operation device 62B in a second room 202 through a bus line. As the bus line connected at this time, for example, the bus line of IEEE 1394 standards described in the first embodiment is used.

In addition, the game main body 60 is connected to a modem device 71, and bidirectional communication with a wireless transmission device 73 connected to a modem device 72 in the second house 300 is performed by a telephone line 70 connected to the modem device 71. The wireless transmission device 73 performs bidirectional wireless communication with a wireless transmission device 74 connected to a receiver 63A and an operation device 63B which are installed in a third room 301 in the second house 300, and performs bidirectional wireless communication with a wireless transmission device 75 connected to a receiver 64A and an operation device 64B which are installed in a forth room 302 in the second house 300. In a configuration for performing radio communication in this house, transmission with the frame configuration described in the second embodiment is performed.

With this configuration, an interplay game can be executed in a plurality of rooms in a plurality of houses. Communication between the first house 200 and the second house 300 may be performed by using a communication means other than the telephone line 70.

According to the communication method described in the first aspect, when an interface, respective display means, and respective operation means are only connected to each other through a common bus line in which isochronous transfer and asynchronous transfer can be performed in a time division manner, and communication of respective data can be performed between one game program execution means, the respective display means, and the respective operation means. A communication process for independently displaying execution states of the game program based on the operations of the respective operation means on the respective display means corresponding to the operation means.

According to the communication method described in the second aspect, in the invention described in the first aspect, each display means is designed such that video data of a region allocated to the corresponding display means can be received and decoded, and the display means can display only a video image transmitted to the corresponding display means. For example, hiddenness can be given to a display in each display means, and a game program can be preferably executed among a plurality of persons.

According to the communication method described in the third aspect, in the invention described in the first aspect, when wireless communication is performed as communication between an interface, respective display means, and respective operation means, execution of a game program by respective displays using the plurality of display means and the plurality of operation means can be performed without directly connecting the interface, the respective display means, and the respective operation means by a signal line.

According to the communication apparatus described in the fourth aspect, a game program execution means, respective display means, and respective operation means are connected to each other a bus line in which isochronous transfer and asynchronous transfer can be performed in a time division manner, and a communication state on the bus line is controlled by a communication control means, so that a system which can perform communication of respective data between one game program execution means, the respective display means, and the respective operation means is congifurated. A communication apparatus in which execution states of a game program based on the operations of the respective operation means can be independently displayed on the respective display means corresponding to the operation means with a simple connection configuration can be obtained.

According to the communication apparatus described in the fifth aspect, in the invention described in the fourth aspect, the respective display means can receive and decode, of data transmitted from the communication control means, only video data of regions allocated to the respective display means, so that each display means can be display only a video image transmitted for the corresponding display means. For example, hiddenness can be given to the display of each display means, and a communication apparatus which can preferably execute a game program among a plurality of persons can be obtained.

According to the communication apparatus described in the sixth aspect, in the invention described in the fourth aspect, when the communication control means controls wireless communication between the game execution means, the respective display means, and the operation means, execution of a game program by respective displays using the plurality of display means and the plurality of operation means can be performed without directly connecting the game execution means, the respective display means, and the respective operation means by a signal line.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A communication method comprising the steps of:

communicating game program execution means for executing a game program having at least a video image with a plurality of display means and a plurality of operation means through a predetermined interface;

setting, for communication between the interface, the respective display means, and the respective operation means, a first period in which isochronous transfer is performed and a second period in which asynchronous transfer is performed every predetermined cycle;

dividing the first period in which isochronous transfer is performed into regions for transmitting video data to the respective display means to independently execute transmitting operations;

transmitting operation data from the respective operation means in the respective regions in the period in which asynchronous transfer is performed; and causing the display means and the operation means to independently communicate with the game program execution means by using a same communication path and performing independent operations in the respective operation means and independent display operations in the respective display means for a game program executed by the game program execution means.

2. The communication method according to claim 1, wherein each respective display means receives and decodes only video data of a region allocated to a corresponding display means.

3. The communication method according to claim 1, wherein the step of communicating between the interface, the respective display means, and the respective operation means is presented by wireless communication.

4. A communication apparatus comprising:

game program execution means for executing a game program having at least a video image;

a plurality of display means for displaying a video image based on the game program executed by the game program execution means;

a plurality of operation means for instructing execution of the game program in the game program execution means; and communication control means for controlling data communication between the game program execution means, the plurality of display means, and the plurality of operation means, for controlling communication in a predetermined cycle as a data communication state, for setting a first period in which isochronous transfer is performed in the cycle and a second period in which asynchronous transfer is performed in the cycle, for performing communication in divided regions for transmitting video data to the respective display means in the first period in which isochronous transfer is performed, and independently communicating operation data from the respective operation means in the second period in which asynchronous transfer is performed.

5. The communication apparatus according to claim 4, wherein each respective display means receives and decodes only video data of a region transmitted from the communication control means and allocated to the corresponding display means.

6. The communication apparatus according to claim 4, wherein the communication control means controls radio communication between the game program execution means, the respective display means, and the respective operation means.

* * * * *